United States Patent [19]

Brastow

[11] 4,215,262
[45] Jul. 29, 1980

[54] AUTOMATIC PERCUSSION WELDING APPARATUS WITH STUD FEED

[75] Inventor: Carl H. Brastow, Foxboro, Mass.

[73] Assignee: Conceptual Engineering, Foxboro, Mass.

[21] Appl. No.: 883,816

[22] Filed: Mar. 6, 1978

[51] Int. Cl.² .................. B23K 9/22; B23B 31/00
[52] U.S. Cl. .................................. 219/95; 219/98; 219/103; 219/143; 279/1 SG
[58] Field of Search .............. 219/95, 96, 98, 99, 219/143, 103, 141, 150 V, 161; 279/1 SG, 23, 102; 269/254 R

[56] References Cited

U.S. PATENT DOCUMENTS

| | | | |
|---|---|---|---|
| 2,372,251 | 3/1945 | Checkos | 219/143 |
| 3,339,799 | 9/1967 | Spisak | 219/98 |
| 3,448,236 | 6/1969 | Spisak | 219/98 |
| 3,891,819 | 6/1975 | Ullmann et al. | 219/69 M |
| 4,145,596 | 3/1979 | Pignal | 219/99 X |
| 4,162,388 | 7/1979 | Heider | 219/95 X |

FOREIGN PATENT DOCUMENTS 189969 1/1967 U.S.S.R. .................... 219/103

Primary Examiner—B. A. Reynolds
Assistant Examiner—Keith E. George

[57] ABSTRACT

A percussion welder includes a single acting main cylinder having a ram extending through both ends of the cylinder mounting a spring loaded chuck on one end of the ram and an adjustable return spring on its other end.

An automated version includes a hollow ram for the main cylinder through which a stud to be welded is blown from an escapement in a vibratory feeder bowl. The escapement has two spaced guide rails which receive the studs in a single column and a block which slides transversely across the end of the rails to pick off a single stud and move it into alignment with a gush of air which blows the stud head first through a tube to the hollow ram. A chuck having a stationary and a movable clamp is mounted on the opposite end of the ram. An actuator is disposed adjacent the chuck and opens the chuck to permit the stud to pass therethrough and at the same time places a platform beneath the chuck to prevent the stud from exiting the chuck more than a selected distance. When the actuator is withdrawn the body of the stud is clamped with the head outside the chuck. One of the clamps is provided with a centering groove to ensure proper disposition of the stud.

27 Claims, 15 Drawing Figures

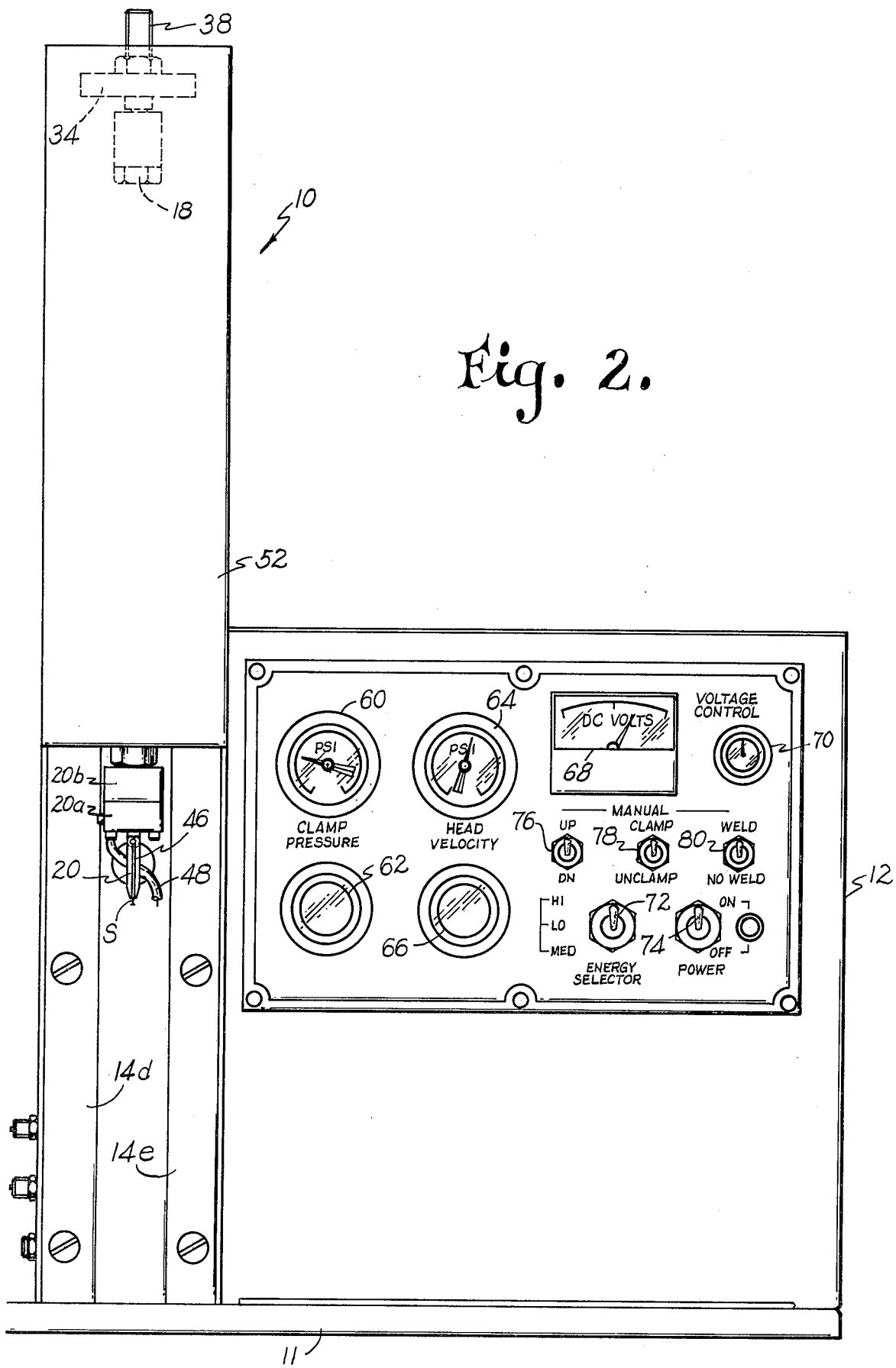

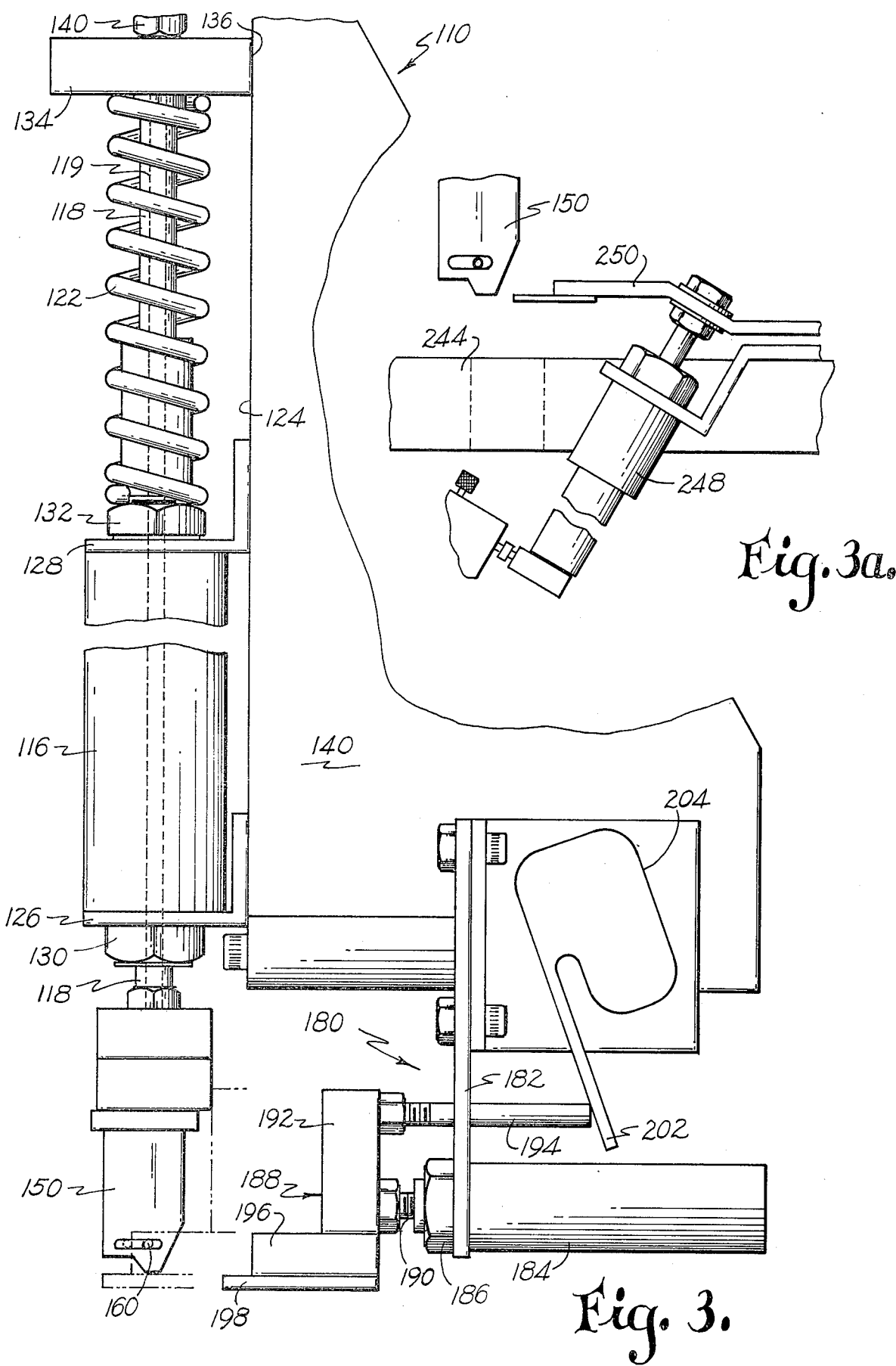

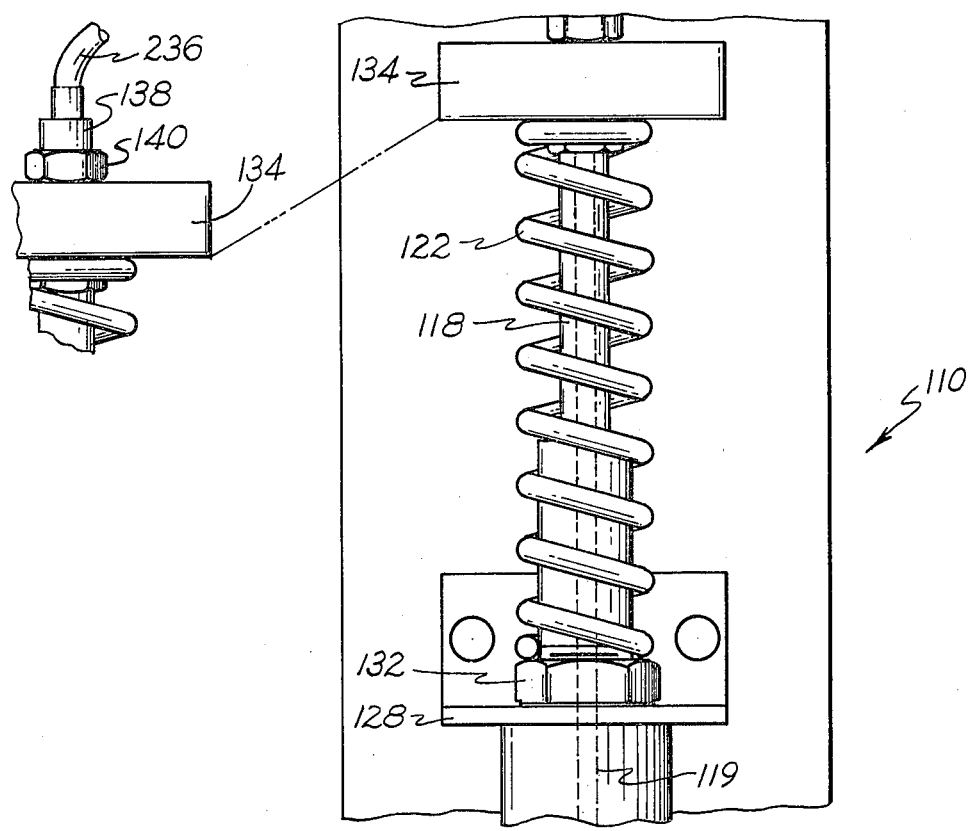
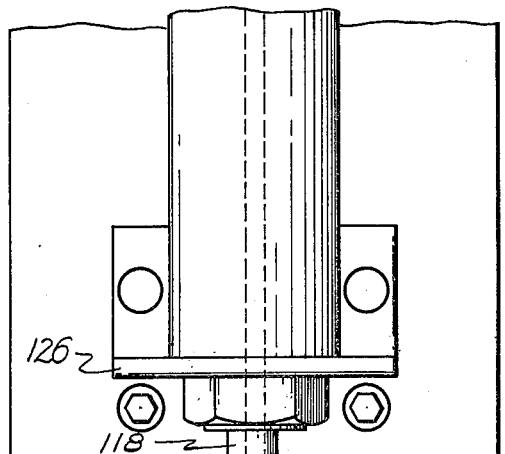
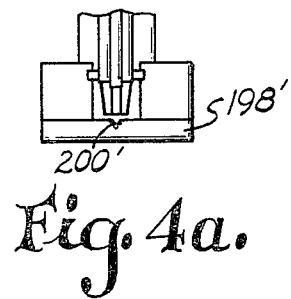
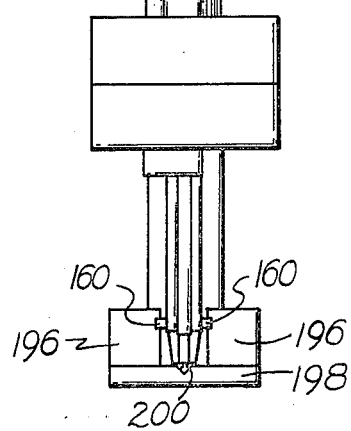
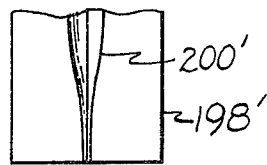
Fig. 4a.
Fig. 4b.
Fig. 4.

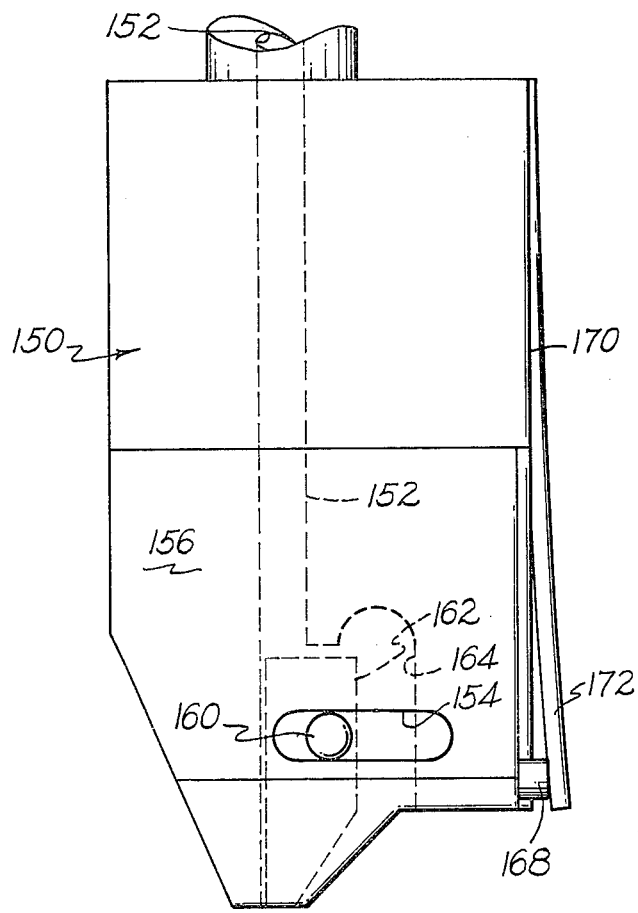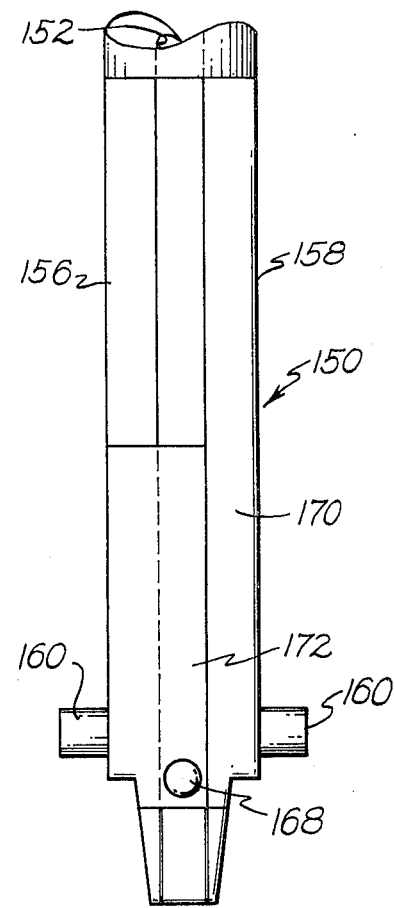
Fig. 5.  Fig. 6.
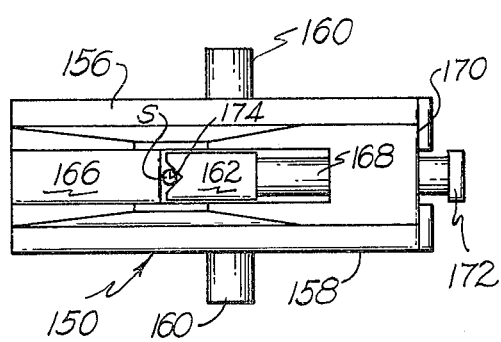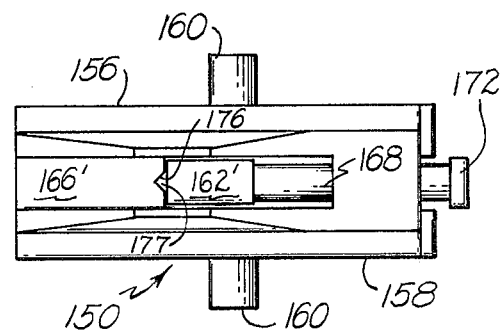
Fig. 7.  Fig. 7a.

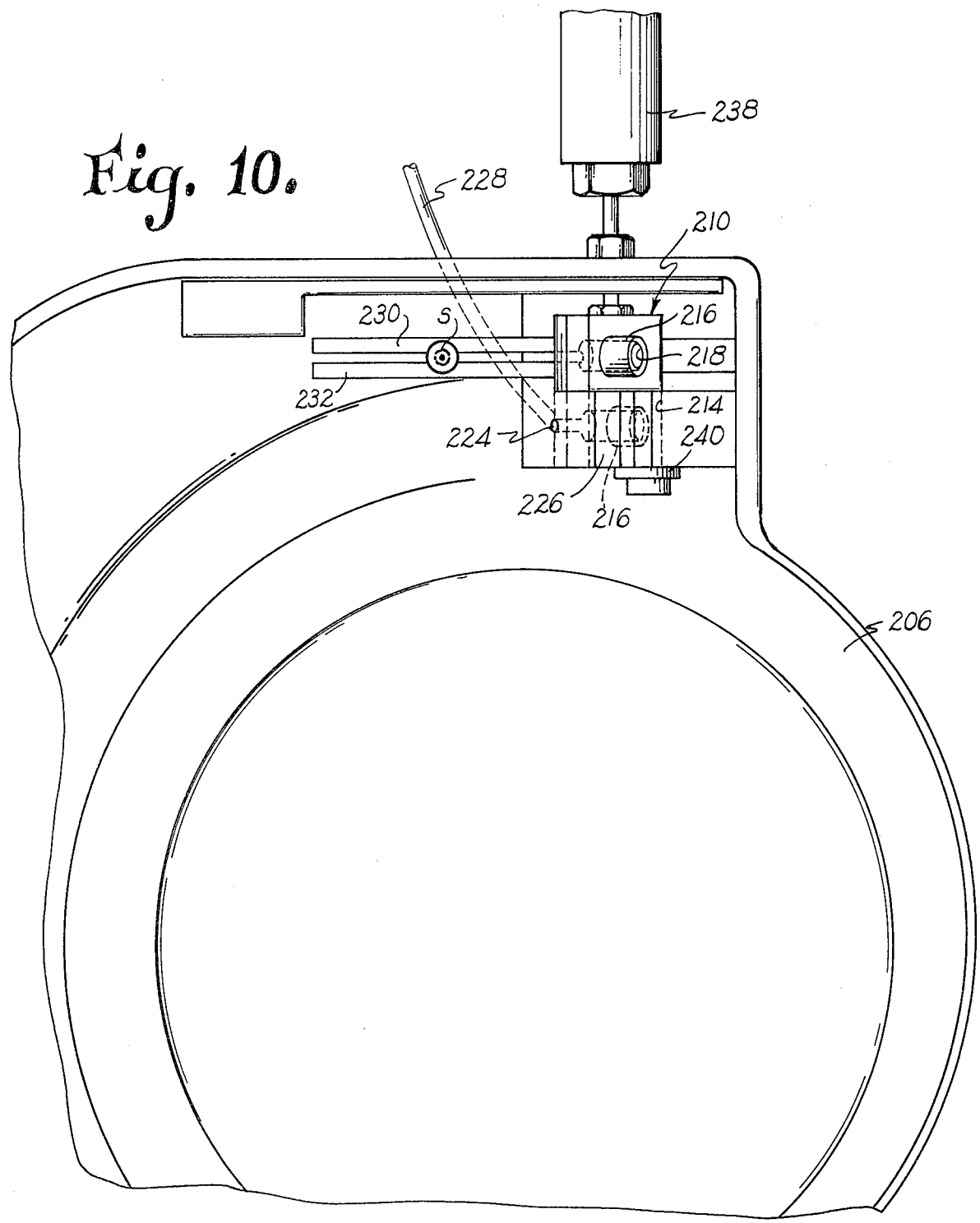

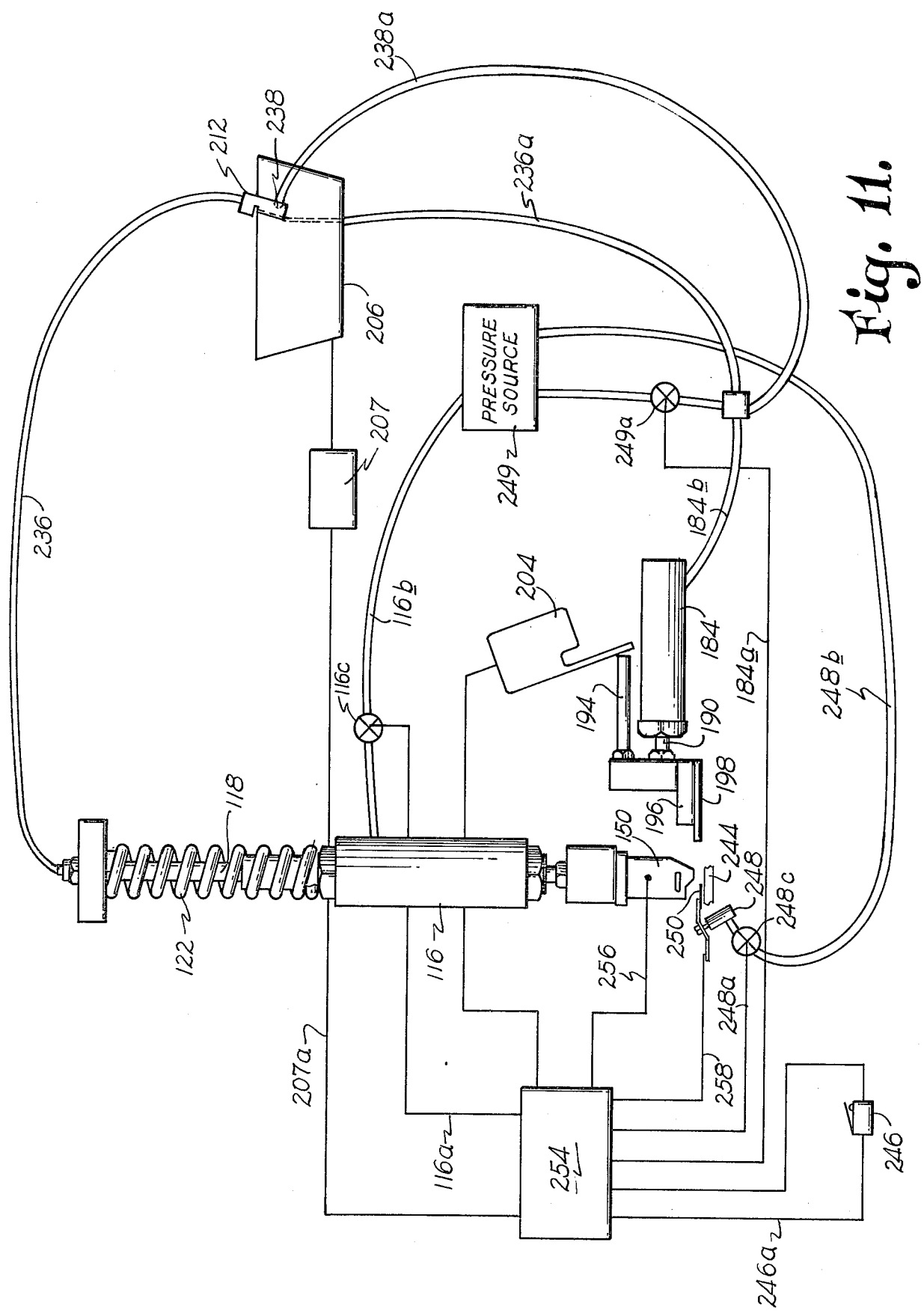

AUTOMATIC PERCUSSION WELDING APPARATUS WITH STUD FEED

This invention relates to welding apparatus and more specifically to percussion welders.

Percussion welding is particularly useful in certain industries, such as in electronics or jewelry, where it is required to weld relatively small objects and where it is desirable to minimize flash. Further this type of welding can be employed with dissimilar metals. One common use is to weld ear ring posts or studs to the main body of the rings. In the past this operation has been time consuming since an operator was required to separate a stud from a group, pick it up and insert it into a chuck generally mounted on a double acting cylinder, then fire the cylinder to effect the welding operation. It has been a slow operation since the studs are very small, in the order of 0.027 to 0.031 of an inch diameter for the body portion. Attempts have been made to automate the process but they have been generally too expensive and cumbersome. One such attempt employs a turret having a plurality of chucks, such as four spaced 90 degrees apart around the turret. A stud is fed from a conventional vibratory bowl and forced body first into one of the chucks which is provided with a spring to hold the stud in place. The turret is then rotated 90 degrees and the whole turret assembly is moved downwardly toward the work piece until the stud contacts the work piece and the electrical discharge is effected to weld the parts together. The turret is raised and rotated another 90 degrees. This approach not only requires elaborate indexing mechanisms but is inherently inefficient in its utilization of its component parts inasmuch as it requires four chucks to handle the studs.

It is an object of the present invention to provide a welder which is inexpensive yet reliable, one in which the feeding of the studs to be welded to the chuck is automated in a single yet highly effective manner. Another object is the provision of a percussion welder which can be adapted for use as a forge welder and one which has an improved control over the quality of the weld. Yet another object of the invention is the provision of an improved escapement mechanism to separate a single stud from a group and a transport mechanism to transport the separated stud to an automatically controlled chuck. Another object is the provision of automatic centering means for centering the stud within the chuck.

These and other objects will become apparent from the following description taken in conjunction with the drawings in which:

FIG. 2 is a front elevational view of the FIG. 1 apparatus with the work table omitted;

FIG. 3 is a side elevational view of a portion of a second embodiment of the invention;

FIG. 3a is a partial side view of a work piece clamp useful with the FIG. 3 embodiment;

FIG. 4 is a partial front elevational view of the apparatus shown in FIG. 3;

FIG. 4a is a front view of a portion of a modified actuator assembly useful in the FIGS. 3 and 4 embodiment;

FIG. 4b is a top plan view of a portion of a platform of the FIG. 4a actuator assembly;

FIGS. 5-7 are side, front and bottom views of a chuck used in the FIG. 3 embodiment in the closed position;

FIG. 7a is a bottom view of a modified form of the chuck shown in FIGS. 5-7;

FIG. 10 is a top plan view of the FIG. 9 vibratory bowl feeder and escapement with the sliding block shown in two alternate positions; and FIG. 11 is a schematic diagram chowing the pneumatic and electrical relationships of the several elements of the FIGS. 3, 4 embodiment.

Figure 1:
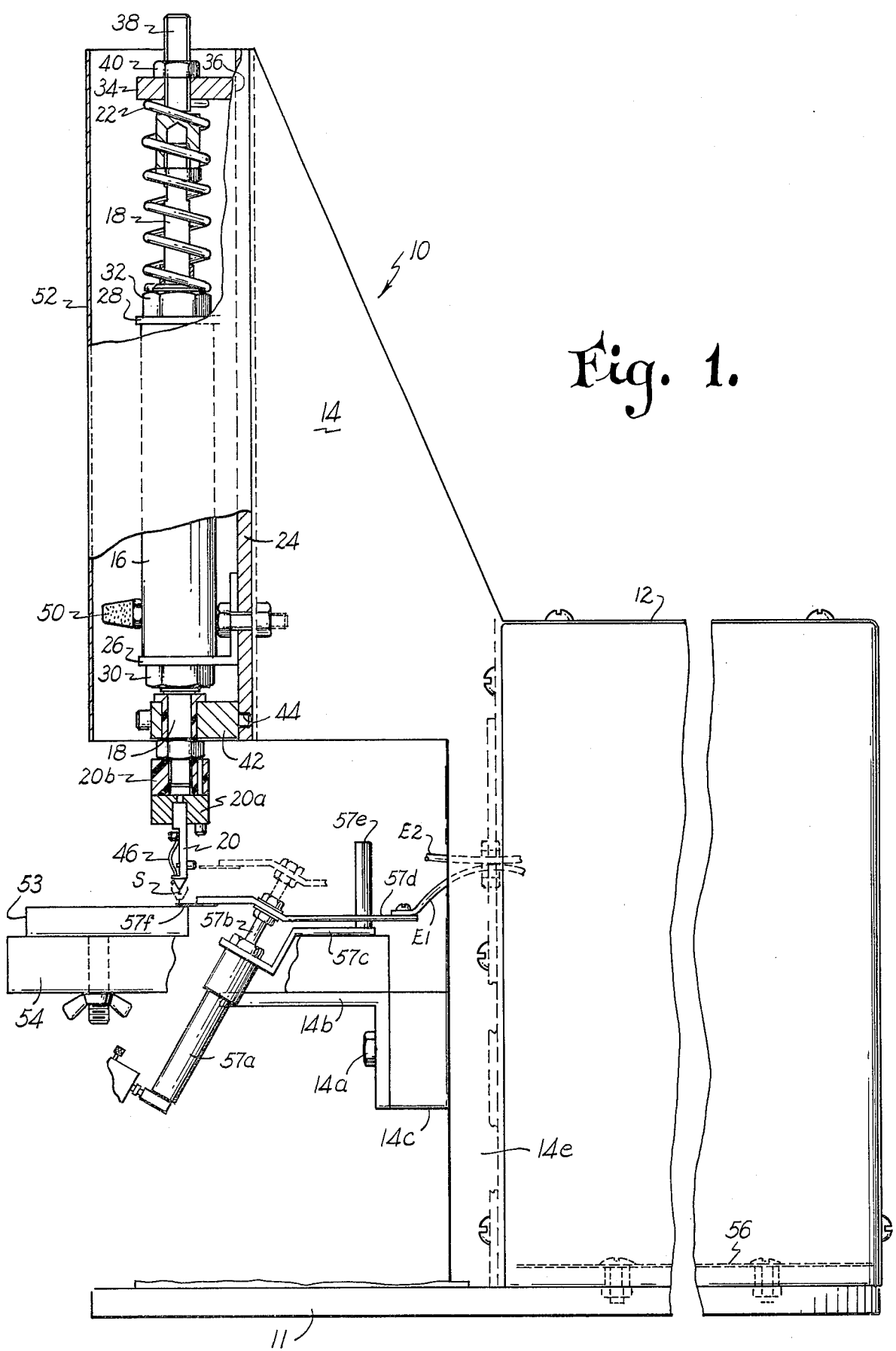
FIG. 1 is a side elevational view of a first embodiment of the invention.
Figure 8:
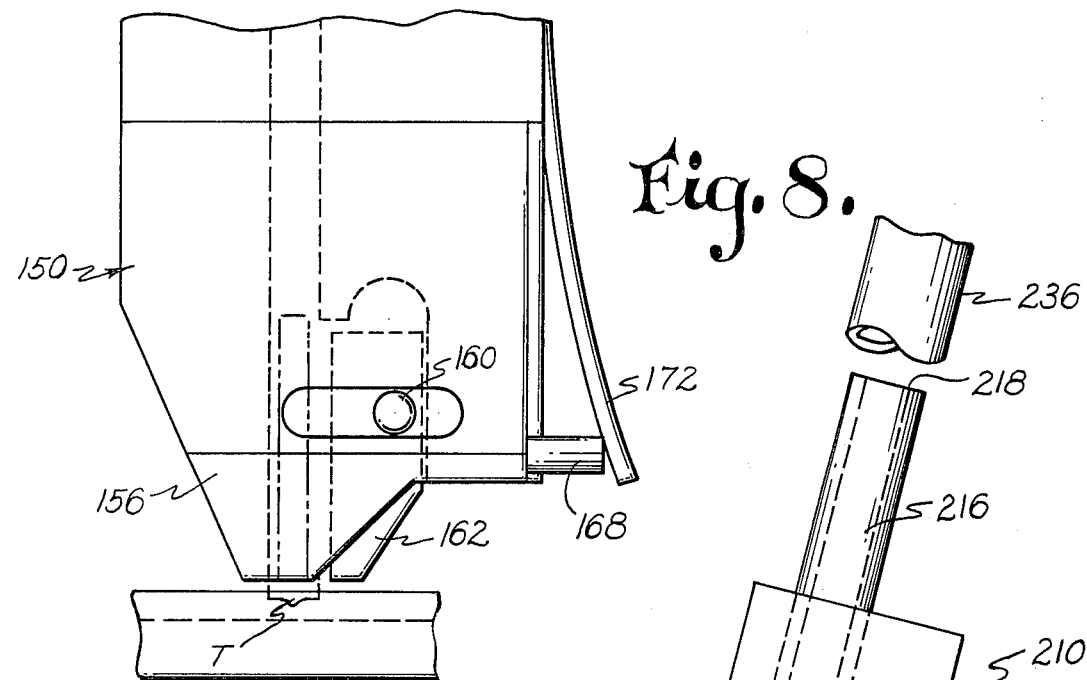
FIG. 8 is a side elevational view of the chuck shown in FIGS. 5-7 in the open position.

Briefly a percussion welder made in accordance with the invention includes a main double acting pneumatic cylinder modified into a single acting spring return device having a ram which extends through both ends of the cylinder. The cylinder is vertically disposed so that upon actuation the ram will stroke downwardly. A return coil spring is disposed around the top portion of the ram above the cylinder. The compression of the spring, with the ram in its initial at rest position, can be adjusted to thereby effect the velocity of the ram as it approaches its fully extended position. This feature provides an important control of the weld quality. A spring loaded chuck is mounted on the lower end of the ram and is adapted to clamp the body portion of a stud like element therein. A work piece is placed on a vertically adjustable table beneath the ram and held thereon by an electrode clamp. The chuck also serves as an electrode and an electric field is established between the stud and work piece so that when the main cylinder is fired and the stud approaches the work piece an electrical discharge occurs in the form of an arc which causes a tip projecting from the stud to melt and the contiguous materials of the stud and work piece to coalesce as the two are brought into contact with one another.

This invention also includes an automated welder which includes a vibratory bowl feeder on which is mounted a pneumatically operated escapement including closely spaced guide rails through which the studs travel to an end thereof when a block slides transversely across the end of the guide rails picking off a single stud and carrying it into alignment with a stream of air directed through a tube. The tube leads to the top end of a hollow ram of a main cylinder which mounts on its bottom end a chuck having a stationary electrode clamp member with a clamping surface in alignment with the bore of the ram and a movable electrode clamp member which is urged toward the stationary clamp member by a spring mounted on the chuck. The movable clamp member has a follower pin projecting from each of two opposite sides and extending through slots in the side walls of the chuck. A pneumatically operated actuator is disposed adjacent the chuck and includes a pair of pusher blocks and a platform attached to a piston rod of a single acting spring return actuator cylinder. When the actuator cylinder is fired and the piston rod moves to its extended position the pusher blocks engage respective follower pins and force the movable clamp member away from the stationary clamp member thereby opening the bore through the chuck. At the same time the platform is brought beneath the chuck a selected distance so that the stud which is blown through the tube head first falls through the chuck and comes to rest with its head projecting out of the mouth of the chuck in contact with the platform. The single acting spring return actuator cylinder is then allowed to retract the actuator allowing the movable clamp member to move toward the stationary clamp member to firmly grasp the body of the stud with the head disposed beneath the chuck still in contact with the platform as it slides back into its retracted position. The movable clamp member has a vertically extending V-shape groove in its clamping surface which serves to automatically center the stud within the chuck. The platform is also provided with a similar V-shape groove on its top surface which extends in a direction parallel to its rectilinear movement and aligned with the bore in the chuck which prevents the stud from skew placement when the stud comes to rest on the platform.

The main cylinder is fired causing the ram to descend until the stud contacts a work piece which has previously been placed therebeneath in a suitable electrode clamp. An electric field is created between the stud through the chuck and the work piece through the electrode clamp which breaks down as the stud approaches the work piece causing an arc therebetween melting a tip projecting from the stud and coalescing the contiguous materials of the stud and work piece as they are brought into contact with one another. The main cylinder ram is then brought back to its initial at rest position under the action of a return spring of the type employed in the previously mentioned embodiment.

The chuck can readily be modified to facilitate the transmission of considerable force through the stud to the work piece by placing the centering groove in the stationary clamp member rather than the movable clamp member and providing a shelf or stop surface a selected distance from the mouth of the chuck for the stud to bottom against.

Turning now to the drawings, particularly FIGS. 1 and 2, numeral 10 is used to designate a first embodiment of the invention comprising a manually operated welder. Welder 10 includes a base 11, a housing 12 mounted thereon to accommodate electrical and pneumatic controls for the welder and a support 14 for mounting cylinder 16. Cylinder 16 is a double acting type modified into a single acting type and comprises a pneumatically operated ram 18 extending through the cylinder and having a combination electrode/chuck 20 attached at the bottom end thereof and a return coil spring 22 received on its top end. Support 14 includes a vertically disposed surface or plate 24 to which are connected by any suitable means, as by conventional bolds, angle iron members 26, 28 which in turn rigidly support cylinder 16 in cooperation with nuts 30 and 32. Return spring 22 extends between nut 32 and an anti-rotational member 34 having a bore extending therethrough also mounted on the top end portion of ram 18. Anti-rotational member 34 may be of any convenient configuration, such as rectangular, having a flat straight surface 36 adapted to be closely disposed to plate 24 as the ram strokes up and down (e.g. within 1/32 of an inch). Member 34 is preferably composed of material having a relatively low coefficient of friction, such as a phenolic or the like, and is keyed in any suitable manner to ram 18 so that as the ram moves the angular orientation of chuck 20 will not materially change.

The top end of ram 18 is provided with a threaded portion 38 so that a nut 40 can adjustingly secure anti-rotational member 34 to the cylinder assembly. Thus the amount of compression of spring 22 can readily be adjusted as desired by raising or lowering member 34 via nut 40. The velocity of chuck 20, as it approaches the limit of its downward stroke, can therefore be adjusted. For instance, should greater velocity be desired then the compression of spring 22 is decreased by raising nut 40.

Although not necessary, a guide member 42 having a portion extending into a guide hole 44 in plate 24 may be mounted on ram 18 to assure precise disposition of cylinder 16.

Chuck 20 has a vertically extending bore in communication with its mouth or bottom surface to receive therein a stud s to be welded to a work piece. A leaf spring 46 allows the stud to be inserted into the chuck and then claspingly maintains it in place until the welding operation has been completed.

Pneumatic typed means 48 as seen in FIG. 2 leads to the cylinder from a solenoid controlled valve mounted in housing 12. As shown in FIG. 1 a filter 50 is provided so that no dirt or other gross contaminants are sucked into the piston area. A cover 52, partially broken away in FIG. 1, is received over the cylinder assembly to enhance the appearance of the apparatus.

When a pressurized air source is placed in communication with the inlet of cylinder 16 through tube means 48 ram 18 moves downwardly from the solid line position in FIG. 1 to the phantom line position. The work piece is positioned in a fixture 53 fixed to table 54 which is adjustable in a vertical direction so that the position of the work piece can be optimized relative to the bottom of stud s when ram 18 is at its maximum downward position. Bolt 14a extends through bracket 14b supporting table 54 and a spacer 14c which extends across angle irons 14d and 14e to another block on the back side of angle irons 14d and 14e to provide a convenient means for adjusting the position of table 14.

The instant invention employs a conventional welding process known as percussion welding. In this type the heat for welding is obtained simultaneously over the entire area of the abutting surfaces of stud s and the work piece from an arc produced by a rapid discharge of stored electrical energy. The energy, which is of a relatively high amperage, low voltage is provided by capacitors in a suitable power supply disposed in housing 12 on circuit board 56. During the discharge a selected amount of force is applied to coalesce the stud and work piece material and form the weld. Since the power supply per se may be conventional and does not form a part of the invention it will not be discussed in detail; however. FIG. 2 depicts typical controls which may be provided. "Clamp Pressure", gauge 60 refers to a pneumatic clamp 57 used to hold the work piece and make electrical contact therethrough. As shown in FIG. 1, The clamp 57 may be of a conventional design including a double acting cylinder 57a, piston rod 57b, stationary bracket 57c and movable electrode member 57d which rides between the solid line position and the phantom line position shown in FIG. 1 on guide post 57e. One distal end of member 57d is connected to lead El while its opposite distal end 57f comprises V shaped prongs to stradle and clamp the work piece. The clamp pressure can be adjusted within a selected range by rotation of knob 62 shown in FIG. 2. Gauge 64 refers to the velocity of ram 18 and can also be adjusted within a selected range by rotation of knob 66. It should be noted that return spring 22 provides an additional control of the ram, particularly as it approaches its downward limit as the compression of the spring decreases. Voltmeter 68 provides an indication of the specific energy level set for the welding process which level can be adjusted within selected ranges by knob 70. The specific energy range can be shifted by toggle switch 72 to a high, low or medium range. Toggle switch 74 is an on-off switch while switches 76, 78 and 80 are override controls to control the position of ram 18, the position of the clamp and the discharge of electrical energy respectively. These would typically be used in setting up a new job. Lead E2 connected through suitable wiring to chuck support 20a which is in electrical connection with chuck 20 and the stud s held therein along with lead E1 mentioned above connected to clamp 57 are used to create the electric field between the work piece and the stud. Electrically insulative member 20b disposed intermediate chuck support 20a and ram 18 electrically isolate the chuck assembly from the remainder of the main cylinder assembly.

In operating the welder the operator takes a work piece, such as an ear ring body, places it in a suitable fixture 53 on table 54, selects a stud s and inserts it into chuck 20 then depresses a pedal operated switch (not shown) which activates a solenoid controlled valve to allow air pressure to communicate with the inlet port of clamp cylinder 57a causing the clamp to move from its phantom line position to its solid line position shown in FIG. 1 to securely hold and electrically engage the work piece. After a selected time delay a signal is sent to a solenoid controlled valve to allow pressure to communicate with the inlet port of cylinder 16 causing ram 18 to stroke downwardly. When the electrical field strength exceeds the maximum value of the air, breakdown occurs and a welding arc occurs. The particular energy range, voltage level and head velocity will depend on the specific materials being welded and their size and configuration. After another selected time delay the ram is allowed to ascend under the influence of spring 22 and clamp 57 is retracted to free the work piece.

In FIGS. 3-10 there is shown a welder 110 similar to that of FIGS. 1 and 2 but modified to make it automated. A double acting cylinder 116 modified into a single acting mode, of the type shown in the previous embodiment, is mounted on vertically disposed support plate 124 by means of angle irons 126, 128 which have a cylinder receiving bore in their horizontal extending surface. Nuts 130, 132 are received on threaded portions of the cylinder housing to lock the cylinder in place. Anti-rotational member 134 having a flat straight surface 136 on one end and having a bore therethrough (not shown) is received on end portion 138 of ram 118 and locked thereon by nut 140. Anti-rotational member 134, preferably composed of low frictional material such as a phenolic or the like, is keyed to ram 118 in any suitable manner with surface 136 spaced closely adjacent plate 124 to ensure that the angular position of ram 118 is kept within narrowly defined limits.

Coil spring 122 is received on the upper end of ram 118 between nut 132 and anti-rotational member 134 and provides a return force for bringing ram 118 from its lowermost position to its uppermost position after the pressure source has been removed from the cylinder. Additionally the specific velocity of the ram, particularly as it approaches its nadir position can be adjusted by changing the initial compression of the spring by tightening, or loosening, nut 140.

Ram 118 is provided with a centrally located bore 119 extending entirely along its length for a purpose which will be explained in more detail below.

Attached to the bottom end portion of ram 118 is chuck 150. As best seen in FIGS. 5-8 chuck 150 comprises a housing having a bore 152 extending therethrough from top to bottom. A horizontally extending slot 154 is formed in each of two oppositely disposed faces 156, 158 of chuck 150 and is adapted to receive a follower pin 160 extending from opposite sides of a movable electrode-clamp member 162. A recess 164 is formed within chuck 150 to receive movable member 162 and allow it to slide between a first position (FIG. 5) in which the movable member is in physical contact with a stationary electrode or clamp member 166 and a second position (FIG. 8) in which the movable member is spaced from stationary member 166. A rod 168 is attached to movable member 162 and extends through an aperture in side 170 of chuck 150. Also mounted on side 170 is a leaf spring 172 which places a bias on rod 168 urging movable member 162 toward stationary member 166. A vertically extending V-shape groove is provided in one of the mating surfaces of movable member 162 (groove 174 in FIG. 7) or stationary member 166' (groove 176 in FIG. 7a) to automatically center stud s upon clamping thereof as will be explained in more detail infra.

A chuck actuating assembly 180 (FIGS. 3,4) is mounted on support 140 and comprises a bracket 182 which is provided with a bore to receive therein cylinder 184. Nut 186 is received on a threaded portion of the cylinder housing to secure the cylinder to bracket 182. Actuator 188 is attached to piston rod 190 and comprises an upright portion 192 from which extends an anti-rotation rod member 194 through a bore provided in bracket 182. Thus the desired angular orientation of actuator 188 is assured at all times. Actuator 188 also includes a pair of pusher blocks 196 which are adapted to engage with respective pins 160 of movable electrode-clamp member 162 and a platform 198 with a centering V-shaped groove 200 running along its length and adapted to be disposed beneath bore 152 of chuck 150 when actuator 188 is in its extended position, that is when cylinder 184 has been actuated so that its piston rod is forced outwardly. As seen in FIG. 3 by the phantom lines of actuator 188 that as piston rod 190 strokes into its extended outward position pusher blocks 196 engage pins 160 and force them backwardly against the bias of spring 172 and concomitantly movable member 162 to open bore 152 through the chuck. Cylinder 184 is a single acting, spring return type that is pneumatically driven in the outward stroke.

It will be noted that the free distal end of anti-rotational rod 194 engages arm 202 of a conventional microswitch 204 which is used as a safety switch. Arm 202 must be depressed, that is the actuator must be retracted, for the solenoid controlling cylinder 116 to be actuated.

Figure 9:
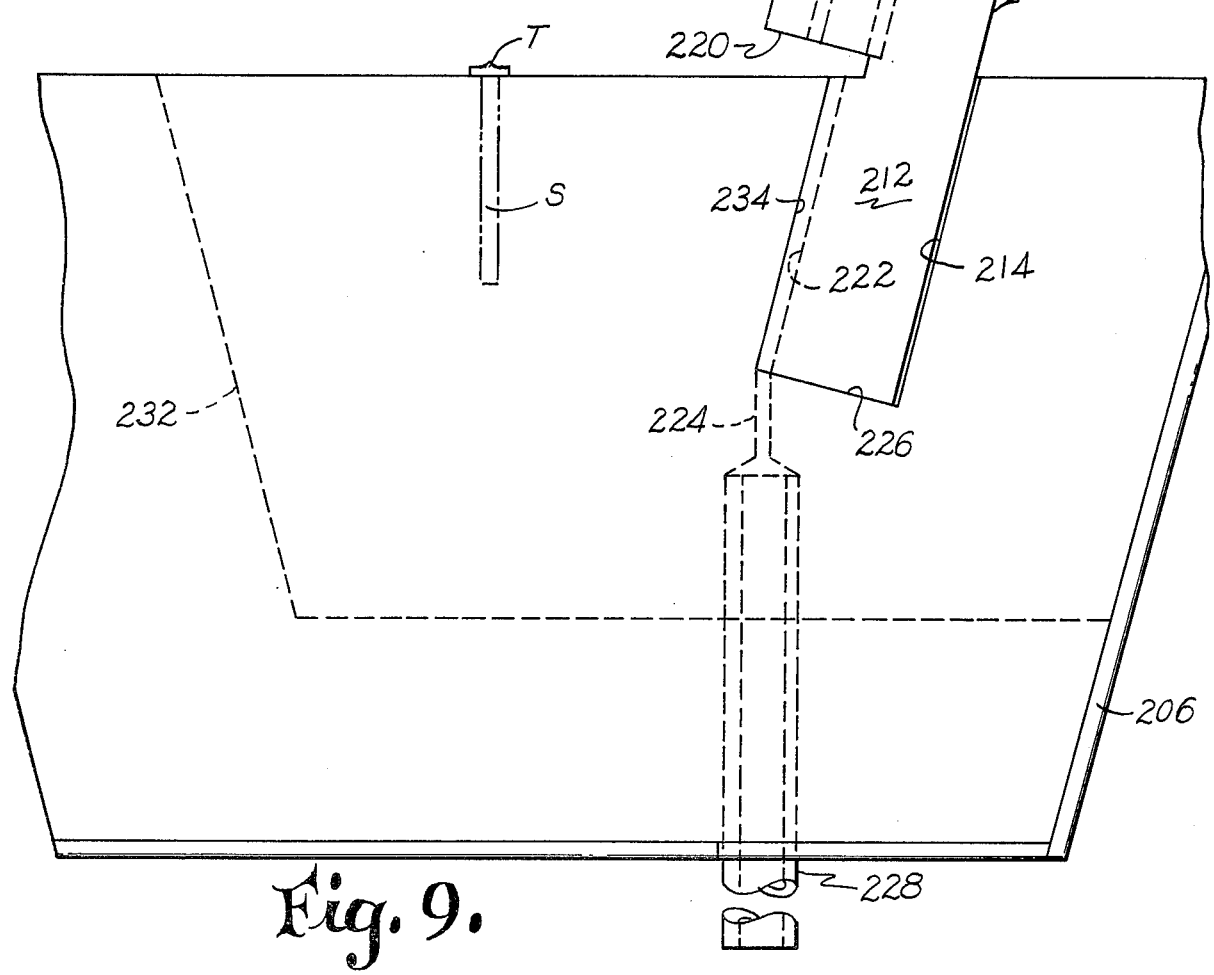
FIG. 9 is a partial side elevational view of a vibratory bowl feeder and escapement mechanism used with the FIGS. 3, 4 embodiment.

FIGS. 9 and 10 show a conventional vibratory bowl 206 used for storing a quantity of studs and feeding them individually along the outer perimeter of the bowl. The bowl mounts thereon a stud escapement and transporting mechanism 210 comprising block 212 which is adapted to slide in a tract 214 between a first outer and second inner position as shown in FIG. 10 in solid and phantom lines respectively. A tube 216 projects from block 212 and has a bore 218 which extends to cut away portion 220. Channel 222 extending from the bottom portion of block 212 up to cut away portion 220 and having a width sufficient to receive the body of a stud s therein is formed in the block 212 in alignment with bore 218. A bore 224 is formed in the frame of track 214 in communication with surface 226 and is connected to a pressure line 228. Bore 224 is in alignment with channel 222 of block 214 when, as seen in FIG. 10, the block is in its second inner position. Spaced guide rails 230, 232 extend from the periphery of bowl 206 and culminate at surface 234 of track 214. Thus as individual studs move circumferentially and up along the ever increasing periphery of bowl 206 they eventually enter the space between the guide rails with the head of the stud supported by the rails. The vibratory motion causes the studs to continue to move along the guide rails until one eventually bottoms against the slide block 212. The stud is received in channel 222 which has a depth approximately equal to the diameter of the main body portion of stud s. Movement of block 212 from the first outer position to the second inner position will separate the stud s positioned in channel 222 from the remainder of the studs between the guide rails and move it until it is positioned in alignment with bore 224. Pressurized air contained in tube 228 then projects stud s through tube 216, through flexible air passage tube 236 which connects tube 216 to the top portion of ram 218. Block 212 is caused to move between the two positions by pneumatic means as indicated at 238 and is limited by a stop 240 in the inner position.

Now with particular reference to FIG. 11 operation of welder 110 will be explained. A suitable fixture, having one or more work piece receiving depressions which may be similar to fixture 53 shown in FIG. 1, has a work piece placed in a mating depression and is placed on table 244.

Foot pedal 246 in line 246a leading to control 254 is employed to initiate the welding cycle and also provide a delayed input feed signal to feed a stud to chuck 150 after welding of a previously presented stud has been accomplished. For reasons to be explained below control 254 is connected to a solenoid valve in pressure line 116b via lead 116a and to solenoid valve 249a via lead 184a. Control 254 also is connected to the welding electrodes via leads 256 and 258 to establish a suitable electric field between chuck 150 and clamp 250 (i.e. the work piece).

Depression of pedal 246 causes clamp 250 to secure the work piece. Chuck 150 then descends breaking down the electric field with an arc traveling from stud s to the work piece causing tip T of the stud to melt and the contiguous surfaces of the stud and work piece to coalesce to effect the welding and ascends at the expiry of the delay of the input feed signal to feed a stud to the chuck. The clamp then releases the work piece at the end of the cycle.

The input feed signal is sent through lead 207a and deenergizes the vibratory drive means 207 of vibratory bowl 206. Interruption of the vibration of bowl 206 while block 212 performs its escapement function is preferred since it enhances trouble free operation without having to provide separate support structure to isolate the escapement from the bowl. At essentially the same time a timer is energized for a selected period and solenoid valve 249a is energized placing the pressure source 249 in communication with three lines. One is line 184b leading to air cylinder 184 which causes piston rod 190 to move outwardly until pusher blocks 196 engage pins 160 forcing them back against the bias of spring 172 and opening bore 152 in chuck 150 and to position platform 198 under bore 152 a selected distance to stop the fall of stud s when it arrives. A second line which is placed in communication with pressure source 249 upon energization of solenoid 249a is line 238a leading to cylinder 238 which causes block 212 to slide in track 214 across the guide rails to pick off a stud from the column of studs positioned therebetween and place it in alignment with bore 224 in the frame of track 214. The third line placed in communication with pressure source 249 upon energization of solenoid 249a is line 236a to supply a gush of air to blow the the stud placed in alignment with bore 224 into tube 236. The stud is blown head first through bore 119 in ram 118, through chuck 150 and comes to rest, head first, on platform 198.

The timer times out causing reenergization of vibratory drive means 207 and the deenergization of solenoid valve 249a. The return of air pressure to atmospheric causes cylinder 184 to retract allowing movable clamp 162 to engage and hold the newly presented stud s, return of block 212 to its first position and cessation of the air stream through line 236. The apparatus is now ready for the next cycle.

In some instances it may be desirable to cause the stud, after coming to rest on the platform, to move upwardly so that its head will be closely adjacent the mouth of the chuck. This may be accomplished, as shown in FIGS. 4a and 4b, by providing groove 200' in platform 198' which has a depth that decreases as the groove extends toward the free distal end of the platform so that upon retraction of actuator 184 the head of the stud will ride up the groove.

Further, it may be desirable to perform force welding with welder 110. This may conveniently be accomplished by modifying chuck 150, as indicated in FIG. 7a by providing groove 176 in the stationary clamp member 166' rather than in movable clamp member 162'. The groove extends a selected distance and terminates at a stop shelf 177 against which the stud can react during the welding operation. That is, the stud can be forced against the work piece with any selected force with the stud bottoming against the stop surface.

While the invention has been described in detail with reference to certain specific embodiments, various changes and modifications which fall within the spirit of the invention and scope of the appended claims will become apparent to the skilled artisan.

I claim:

1. Apparatus for welding an element to a work piece comprising a support, a ram member mounted on the support and adapted for rectilinear motion between a first position away from a work piece station and a second position adjacent the work piece station, pneumatic means for causing the ram to move from its first to its second position and return spring means urging the ram toward its first position, the ram is vertically disposed and has two opposite ends and a bore extends therebetween, chuck means, for clampingly engaging the element, mounted on a portion of the ram closest to the work piece station, the chuck comprising a stationary clamp member having a clamping surface in alignment with the bore in the ram, a movable clamp member adapted for movement toward and away from the stationary clamp member effectively closing and opening the bore, spring means urging the movable clamp member toward the stationary clamp member and actuating means to move the movable clamp member away from the stationary clamp member to permit an element to be received in the chuck, and means for creating an electric field between the element and the work piece.

2. Apparatus according to claim 1 in which the elements are stud like having a body portion of a first diameter and a head portion of a second, larger diameter, and further including feeding and escapement means comprising air passage means, a pair of closely spaced, parallel guide rails adapted to receive a column of elements with their heads supported by the rails, the guide rails having an entrance and an exit end, a slidable block having an element receiving surface adapted to slide transversely to the exit end of the rails and closely adjacent thereto between a first position in which the block received an element from the exit end of the guide rails and a second position in which the received element is in alignment with the air passage means.

3. Apparatus according to claim 2 in which the slidable block includes a tubular member disposed in alignment with the element receiving surface of the block, the feeding and escapement means including a body portion forming a track in which the block slides, the air passage means includes a bore formed in the body portion of feeding and escapement means in alignment with the track and connectable to a source of pressurized air, tubular means extending from the tubular member of the block to the bore of the ram whereby when an element is received in the element receiving surface of the block and is moved into alignment with the bore in the track pressurized air will blow the element head first through the tubular means to the ram and down to the chuck.

4. Apparatus according to claim 1 in which the chuck has a mouth and the actuator means includes a platform movable to a position in alignment with the bore extending through the ram and spaced a selected distance from the mouth of the chuck.

5. Apparatus according to claim 4 in which a generally V-shaped groove is formed in the platform in alignment with the mouth of the chuck.

6. Apparatus according to claim 5 in which the depth of the V-shape groove is tapered along the length of the groove.

7. Apparatus according to claim 1 in which the pneumatic means comprises a cylinder having first and second ends mounted on the support, the ram extending through the cylinder beyond the first and second ends, the chuck received on a portion of the ram extending beyond the first end of the cylinder, the return spring comprising a coil spring received on a portion of the ram extending beyond the second end of the cylinder and means to lock the return spring onto the ram.

8. Apparatus according to claim 7 in which the means to lock the return spring onto the ram includes a threaded member received on a threaded portion of the ram so that the compression of the spring when the ram is in its first position away from the work piece can be adjusted.

9. Apparatus according to claim 7 including means to prevent angular displacement of the ram.

10. Apparatus according to claim 9 in which the means to prevent angular displacement of the ram is an anti-rotational plate having a bore therethrough, the ram extending through the bore, the plate having a straight flat face adapted to move with the ram adjacent a flat surface of the support.

11. Apparatus according to claim 1 in which the movable member has two pins projecting therefrom and the actuating means includes a pair of pusher blocks adapted for movement into engagement with respective pins forcing them and concomitantly the movable member to move against the bias of the spring means away from the stationary clamp member.

12. Apparatus according to claim 11 in which the actuator means includes a pneumatically operated cylinder and piston rod and means to prevent angular displacement of the actuator means.

13. Apparatus according to claim 11 in which a generally V-shaped centering groove is formed in the clamping surface of one of the stationary and movable clamp members and extends in a direction parallel to the axis of the bore.

14. Apparatus according to claim 13 in which the centering groove is in the movable clamp member.

15. Apparatus according to claim 13 in which the centering groove is in the stationary clamp member and a stop surface generally perpendicular to the axis of the bore is provided a selected distance from the mouth of the chuck for the element to react against.

16. Apparatus according to claim 11 in which the chuck has a mouth and the actuator means includes a platform extending between the pusher blocks, the platform being movable with the pusher blocks to a position in alignment with the bore extending through the ram and chuck and spaced a selected distance from the mouth of the chuck.

17. Apparatus according to claim 16 in which a generally V-shaped groove is formed in a surface of the platform in alignment with the mouth of the chuck.

18. Apparatus according to claim 17 in which portions of the V-shaped groove in the platform closest to the chuck have a depth less than contiguous portions of the groove further removed from the chuck.

19. In a welding apparatus having work piece holding means and means to hold an element to be welded to the work piece and move it into engagement with the work piece to effect welding therebetween an improved chuck to hold the element comprising a housing having opposed side walls, a transversely extending slot formed in the opposed side walls, a stationary clamp member mounted in the housing having a clamping surface, a movable clamp member adapted for movement toward and away from the stationary clamp member, two pins projecting from the movable clamp member and extending through respective slots, spring means urging the movable clamp member toward the stationary clamp member, and actuator means to move the movable clamp member away from the stationary clamp member to permit an element to be received between the stationary and movable clamp members, the actuator means to move the movable clamp includes an actuator comprising a pair of pusher blocks adapted for movement into engagement with respective pins forcing them and concomitantly the movable clamp member to move against the bias of the spring means away from the stationary clamp member.

20. Apparatus according to claim 19 in which a generally V-shaped centering groove is formed in the clamping surface of one of the stationary and movable clamp members and extends in a direction parallel to the axis of the bore.

21. Apparatus according to claim 20 in which the centering groove is in the movable clamp member.

22. Apparatus according to claim 20 in which the centering groove is in the stationary clamp member and a stop surface, generally perpendicular to the axis of the bore is provided a selected distance from the mouth of the chuck for the element to react against.

23. Apparatus according to claim 19 in which the chuck has a bore extending through the housing from a top portion to a bottom mouth portion, the stationary clamp member having a clamping surface in alignment with the bore, the movable clamp member effective to close and open the bore, means to feed an element to the chuck the actuator means also including a platform being movable with the pusher blocks to a position in alignment with the bore extending through the chuck and spaced a selected distance from the mouth of the chuck, said platform serving as a stop for elements fed to said chuck.

24. Apparatus according to claim 23 in which a generally V-shaped groove is formed in a surface of the platform in alignment with the mouth of the chuck.

25. Apparatus according to claim 24 in which portions of the V-shaped groove in the platform closest to the chuck have a depth less than contiguous portions of the groove further removed from the chuck.

26. Apparatus for welding an element to a work piece comprising a support, a ram member mounted on the support and adapted for rectilinear motion between a first position away from a work piece station and a second position adjacent the work piece station, pneumatic means for causing the ram to move from its first to its second position and return means for returning the ram to its first position, chuck means for clampingly engaging an element, means for feeding an element to the chuck means, the chuck means having a mouth and being mounted on a portion of the ram closest to the work station, means for creating an electric field between the element and the work piece, and a platform movable to a position in alignment with the mouth of the chuck spaced a selected distance therefrom, said platform serving as a stop for elements fed to said chuck means.

27. Apparatus according to claim 26 in which a generally V-shaped groove is formed in a surface of the platform in alignment with the mouth of the chuck.

* * * * *